United States Patent
Dunn et al.

(10) Patent No.: US 7,930,907 B2
(45) Date of Patent: Apr. 26, 2011

(54) CRIMP-FREE INFUSIBLE REINFORCEMENT FABRIC AND COMPOSITE REINFORCED MATERIAL THEREFROM

(75) Inventors: Matthew W. Dunn, Philadelphia, PA (US); Juan F. Rodriguez, Seguin, TX (US)

(73) Assignee: OCV Intellectual Capital, LLC, Toledo, OH (US)

( * ) Notice: Subject to any disclaimer, the term of this patent is extended or adjusted under 35 U.S.C. 154(b) by 1227 days.

(21) Appl. No.: 10/699,536

(22) Filed: Oct. 31, 2003

(65) Prior Publication Data

US 2005/0070183 A1 Mar. 31, 2005

Related U.S. Application Data

(63) Continuation-in-part of application No. 10/674,987, filed on Sep. 30, 2003, now Pat. No. 7,168,272.

(51) Int. Cl.
*D04B 23/10* (2006.01)
(52) U.S. Cl. ........................................................ 66/202
(58) Field of Classification Search ........................ None
See application file for complete search history.

(56) References Cited

U.S. PATENT DOCUMENTS

| | | | |
|---|---|---|---|
| 2,731,046 A * | 1/1956 | Bachner | 139/420 R |
| 2,849,785 A * | 9/1958 | McCullough et al. | 428/97 |
| 3,028,884 A * | 4/1962 | MacIsaac, Jr. et al. | 139/402 |
| 4,066,106 A * | 1/1978 | Graham | 139/420 C |
| 4,407,885 A | 10/1983 | Murphy et al. | |
| 4,410,385 A | 10/1983 | Murphy et al. | |
| 4,460,633 A | 7/1984 | Kobayashi et al. | |
| 4,557,968 A * | 12/1985 | Thornton et al. | 442/198 |
| 4,571,355 A * | 2/1986 | Elrod | 428/102 |
| 4,615,934 A | 10/1986 | Ellison | |
| 4,911,973 A | 3/1990 | Dunbar | |
| 5,055,242 A | 10/1991 | Vane | |
| 5,085,928 A | 2/1992 | Krueger | |
| 5,147,714 A | 9/1992 | Ellison et al. | |
| 5,149,583 A | 9/1992 | Saarikettu | |
| 5,445,693 A | 8/1995 | Vane | |
| 5,482,091 A * | 1/1996 | Debaes | 139/391 |
| 5,484,642 A * | 1/1996 | Bompard et al. | 428/166 |

(Continued)

FOREIGN PATENT DOCUMENTS

EP 0 270 411 4/1999

(Continued)

OTHER PUBLICATIONS

Reinforced Plastics, Mar. 2004, "Preview: JEC Composites Show 2004", pp. 40-68.

(Continued)

*Primary Examiner* — Danny Worrell
(74) *Attorney, Agent, or Firm* — Calfee, Halter & Griswold LLP

(57) ABSTRACT

The present invention relates to a composite fabric having a plurality of substantially parallel, aligned tow groups, each of the tow groups having one or more tows wherein a portion of the tow groups contain two or more tows, wherein the spacing between tows in a tow group is less than the spacing between adjacent tow groups. The spacing between adjacent tow groups form flow channels which permit resin to flow evenly and quickly through the fabric. This results in shorter processing time and a more consistent resin distribution, decreasing the likelihood of resin starved areas within the cured laminate.

34 Claims, 5 Drawing Sheets

U.S. PATENT DOCUMENTS

| | | | |
|---|---|---|---|
| 5,809,805 | A | 9/1998 | Palmer et al. |
| 6,599,610 | B2 * | 7/2003 | Homma et al. ............... 428/102 |
| 7,186,272 | B2 | 1/2007 | Dunn |
| 7,325,652 | B2 | 2/2008 | Huff et al. |
| 2005/0136758 | A1 | 6/2005 | Newton et al. |

FOREIGN PATENT DOCUMENTS

| | | |
|---|---|---|
| EP | 0 909 845 | 4/1999 |
| EP | 1 419 875 | 5/2004 |
| WO | 2005/032804 | 4/2005 |

OTHER PUBLICATIONS

Office action from Canadian Application No. 2,537,941 dated Jul. 16, 2010.

Communication from EP Application No. 04783721.6 dated Oct. 22, 2007.

Communication from EP Application No. 04783721.6 dated Aug. 25, 2008.

Communication from EP Application No. 04783721.6 dated Sep. 8, 2008.

Communication from EP Application No. 04783721.6 dated Dec. 19, 2008.

Communication from EP Application No. 04783721.6 dated Feb. 5, 2010.

Communication from EP Application No. 04783721.6 dated May 3, 2010.

Office action from Chinese Application No. 200480028491.5 dated Mar. 7, 2008.

Office action from Chinese Application No. 200480028491.5 dated Jul. 17, 2009.

Office action from Chinese Application No. 200480028491.5 dated Feb. 5, 2010.

Office action from Indian Application No. 586/KOLNP/2006 dated Jun. 16, 2008.

Office action from Mexican Patent Application No. PA/a/2006/007491 dated Jan. 23, 2009.

Notice of Allowance from U.S. Appl. No. 10/674,987 dated Oct. 3, 2006.

Office Action from U.S. Appl. No. 10/674,987 dated May 17, 2006.

Office Action from U.S. Appl. No. 10/674,987 dated Aug. 19, 2005.

International Search Report from PCT/US04/29605 dated Jan. 20, 2005.

* cited by examiner

CRIMP-FREE INFUSIBLE REINFORCEMENT FABRIC AND COMPOSITE REINFORCED MATERIAL THEREFROM

RELATED APPLICATIONS

This application is a continuation-in-part of U.S. patent application Ser. No. 10/674,987 filed Sep. 30, 2003 now U.S. Pat. No. 7,168,272, which is hereby incorporated by reference in its entirety.

TECHNICAL FIELD

This invention relates to composite fabrics and to a method of making composite fabrics. More particularly, it relates to an improved composite fabric having flow channels, which, when resin is applied to the fabric during lamination, permit faster resin distribution in the fabric.

BACKGROUND

Composite fabrics made from fibrous materials formed into both woven, knitted and non-woven material, are well-known in the art. Yarns of glass, carbon and graphite are typically formed into fabrics, and a plurality of layers of fabric are stacked and cut into dry fabric preforms. The preforms are then stitched and/or impregnated with a resin binder to form a rigid composite fabric.

Typically, a glass reinforced fibrous mat is preformed and then placed in a mold for molding into a fiber-reinforced article. Glass fiber-reinforcement mats are used in situations where a desired strength is necessary, such as in boat hulls or automobile parts. For example, layers of the continuous strand mat and layers of unidirectional or multidirectional reinforcement material are fabricated separately. These layers are individually placed in a set of preform screens, which generally consist of an upper screen and a lower screen. The upper and lower screens are moved together in order to conform the layers to the shape of the preform screens. The layers are thus shaped into what is known as a preform. The preform is then placed in a mold and injected with a suitable resinous material to make the fiber-reinforced article.

As shown in U.S. Pat. No. 4,911,973, to facilitate impregnation of the fabric with resin, holes are typically punched in the fabric as two or more layers of fabric are sewn together. The holes extend through the fabric and when the fabric is impregnated with resin, the resin material flows into the holes in the blanket. The holes in the fabric aid in distributing resin throughout the fabric.

The crimping of the yarns that occurs as the warp and weft yarns cross over and under each other reduces the tensile and, more significantly, the compressive strength of a woven fabric. In the past, fabrics have been designed utilizing yarns having varying denier (fiber diameter) to increase strength and reduce crimping of the fabric.

U.S. Pat. No. 4,615,934 teaches a fabric having warp yarns of heavy denier separated by eight warp yarns of lighter denier. The fabric is incorporated into a polymeric resin by lamination, heat bonding or coating the fabric with the resin. U.S. Pat. No. 5,147,714 (related to U.S. Pat. No. 4,615,934) utilizes this same concept of alternating heavier and lighter denier yarns however the fabric is laminated between two conductive sheets of PVC film.

U.S. Pat. No. 4,460,633 teaches a non-woven reinforcement constructed of high denier warps of non-twist yarns or soft twist yarns on both sides of lower denier wefts of non-twist yarns or soft twist yarns containing an adhesive agent, in which the warps and wefts are bonded where they intersect.

U.S. Pat. No. 4,407,885 and U.S. Pat. No. 4,410,385 (related) teach a composite non-woven fabric and a method of making the composite fabric in which the layers of the fabric are impregnated with a resin binder to form a rigid composite fabric. Thermoplastic fibrous material is incorporated within the structure of non-woven layers. A plurality of layers of fabric are stacked adjacent each other to provide a preform assembly. The layers are then compacted and heated to promote the bonding of the thermoplastic material at junctures between the fibrous non-woven material.

U.S. Pat. No. 5,085,928 teaches porous layers of unidirectional aramid fibers alternated with porous layers of spunlaced nonwoven aramid fibers all of which are embedded in a thermoplastic resin.

U.S. Pat. No. 5,809,805 teaches a warp/knit stitch reinforced multi-axial non-crimp layered fabric sheet. The fabric is comprised of a plurality of plies, which have a different angular relationship to one another, disposed upon one another and knitted or stitched to form a structural sheet. The sheet is then impregnated with a resin.

U.S. Pat. No. 5,445,693 and related U.S. Pat. No. 5,055,242 teach a formable composite material having a plurality of superimposed layers each having a plurality of unidirectional non-woven yarns or threads laid side-by-side. Some of the yarns or thread extend of different layers extend in different directions. The layers are incorporated with a resin material prior to being stitched together.

U.S. Pat. No. 5,149,583 teaches a mat in which reinforcing threads are bound or laminated to form a strong shell structure. The knitting of the mat is performed with a double circular knitting machine to form a weft-knitted mat. The fabric contains a plurality of loops in which reinforcing threads run with the support of the loops and straight between the courses in a channel formed by the loops.

As taught above, it is known to have heavy denier warp yarns separated from each other by lighter denier warp yarns in a warp-inserted weft knit fabric. Also, using sewing needles to form a plurality of channels in a reinforcement blanket to aid in distributing resin throughout the blanket is known. Both methods permit resin to be distributed throughout the fabric.

There is a need to provide a fabric, having continuous fibers, to be used in a molding process, in which the design of the fabric increases the speed of resin infusion to reduce processing time in the mold.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

SUMMARY

The present invention relates to a composite fabric wherein a plurality of substantially parallel, aligned tow groups, each of said tow groups having one or more tows wherein a portion of said tow groups contain two or more tows. The spacing between tows in a tow group is less than the spacing between adjacent tow groups. The spacing between adjacent tow groups form flow channels. The flow channels permit resin to flow evenly and quickly through the fabric, which results in shorter processing time and a more consistent resin distribution, decreasing the likelihood of resin starved areas within the cured laminate.

It is an object of this invention to provide a crimp-free composite fabric.

It is an object of this invention to provide a composite fabric, which is designed to decrease the processing time of resin infusion.

It is an object of this invention to provide a composite fabric that is usable with all types of resin systems.

It is an object of this invention to provide a composite fabric which can be constructed of various types of fibers.

It is an object of this invention to provide a fabric which is constructed of various composite materials, i.e., glass and thermoplastic.

Figure 1:
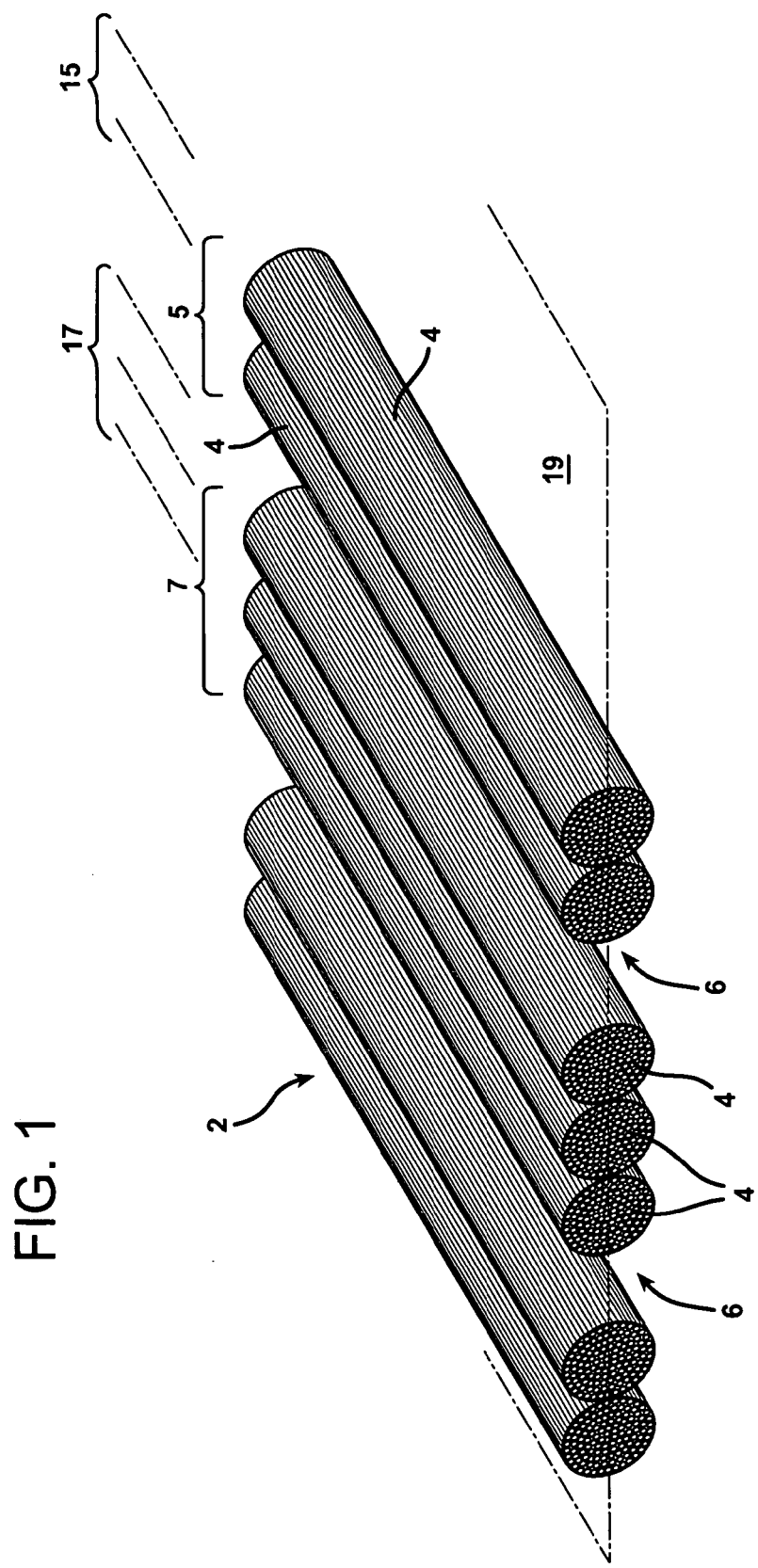
FIG. 1 is a fragmentary, perspective view of a preferred fabric configuration of the present invention.

In describing preferred embodiments of the invention, which are illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although preferred embodiments of the invention are herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF INVENTION

The above objects have been achieved through the development of a fabric comprising a plurality of substantially parallel, aligned tow groups, each of said two groups containing one or more tows wherein a portion of said tow groups contain two or more tows. The spacing between tows in a tow group is less than the spacing between adjacent tow groups. The spacing between adjacent tow groups forms flow channels. The flow channels can be formed in a single ply in a fabric or in any number of plies in a multi-ply fabric. When the fabric is infused with resin, the flow channels permit faster resin infusion of the fabric (typically between about 40% to about 60%).

For the purposes of this invention, the term "tow" refers to an untwisted assembly of a large number of filaments (single fibers). The term "tow group" refers to one or more tows that are closely spaced.

Referring to FIG. 1, a fragmentary, perspective view of the fabric of the present invention is shown. Fabric 2 is made of a plurality of substantially parallel, aligned tows 4 which comprise adjacent tow groups 5, 7. As illustrated in FIG. 1, tow group 5 contains two tows and tow group 7 contains three tows. The tows of tow group 5 have longitudinal axes 15 and tows of tow group 7 have longitudinal axes 17. As shown in FIG. 1, the longitudinal axes 15 and longitudinal axes 17 are co-planar, lying in plane 19. The tow groups in fabric 2 are intermittently spaced, the spaces forming flow channels 6. The placement of flow channels between tow groups may vary, i.e., one tow group, having two adjacent tows, between a tow group, having four adjacent tows, and equally spacing tow groups. The ratio of tow groups to flow channels may be determined by the resin, i.e., a more viscous resin would require equally alternating tow groups to flow channels, thus providing more channels for the flow of the resin. In the alternative, a less viscous resin would require less flow channels.

Figure 2:
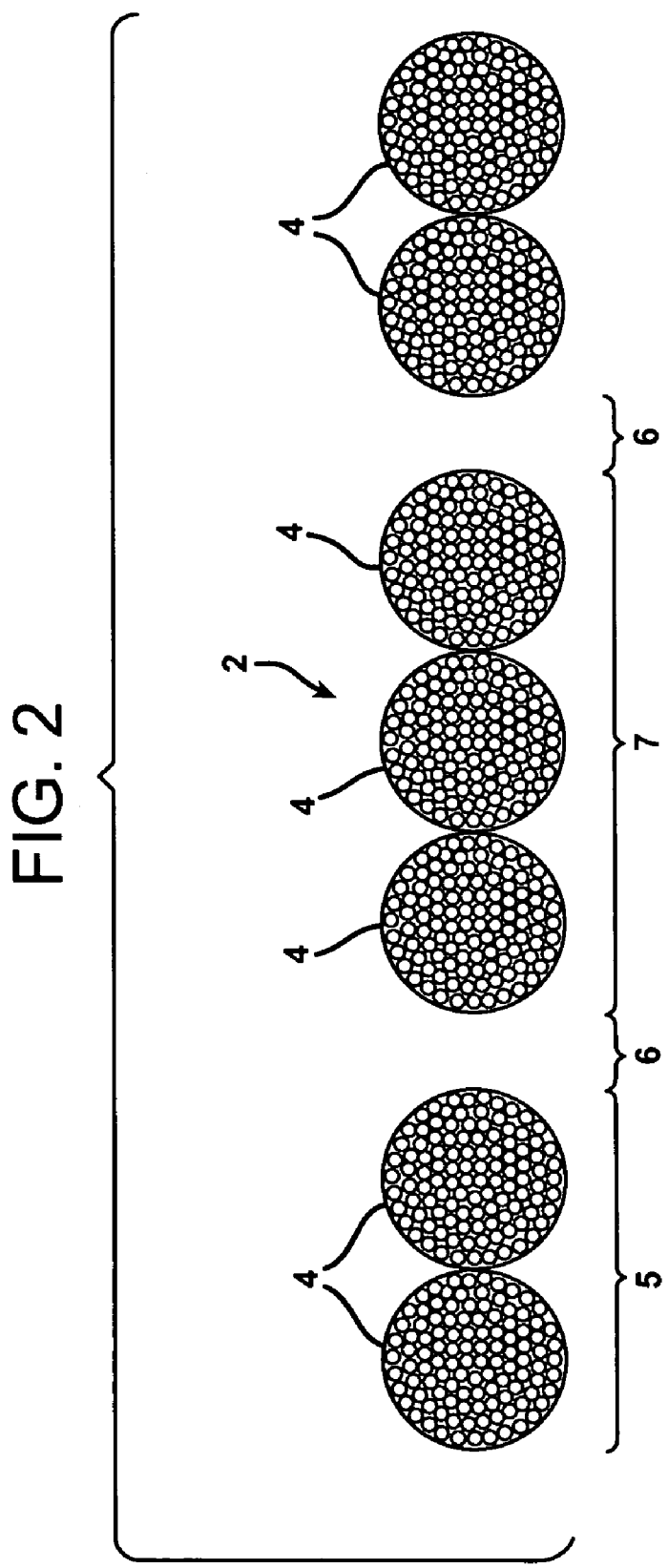
FIG. 2 is a cross-sectional view of a preferred fabric configuration of the present invention.

FIG. 2 illustrates a cross-sectional view of the fabric 2 of FIG. 1 showing tow groups 5,7, containing tow 4. Tow groups 5,7 are spaced so as to form flow channels 6.

FIG. 1 illustrates the tows 4, in tow group 5, as abutting one another. Alternatively (not shown), the tow in the tow groups may be spaced so long as the distance between the tows is less than that of the distance between the tow groups forming the flow channel. The size of the flow channel is typically between about 0.155 to about 1.28 centimeters. Preferably, tows 4 have a yield (yards/pound) of between about 52 to about 450 yield, more preferably of between about 150 to about 350 yield and most preferably between about 150 to about 220 yield.

The present invention is compatible with various different glass fiber-reinforcements. Any suitable unidirectional or multidirectional reinforcement materials can be employed. It is within the contemplated scope of this invention that such unidirectional or multidirectional reinforcement material include, but not be limited to, such materials as, for example, chopped strand mat, knitted rovings or woven rovings, aramid reinforcements or carbon reinforcements. Unidirectional knitted rovings are normally comprised of E-glass rovings, (such as rovings of 300 yield (300 yards/pound)), for example, rovings known as T30 from the Owens-Corning Fiberglas Corporation). Bidirectional knitted roving material is constructed by a precision knitting process. The fiberglass strands are typically treated with a binder or sizing (such as Owens Corning 111A, PPG 2022, etc.), a welting agent, emulsifying agent and water. These sizes or binders are intended to protect the fibers from damage during their formation and subsequent operations of twisting, plying and weaving.

The fabric of the present invention may be constructed of woven, knitted or non-woven fibers, yarns, threads, filaments and the like. The structural fibrous materials may be any well-known materials which form fibers, filaments, threads, yarns, woven fabrics, knitted fabrics, non-woven fabrics, balts, felts, and the like. As used herein, the term, structural fibrous material, embraces all of the various types of materials, which form such fabrics useful to form a composite fabric in accordance with the present invention. Exemplary structural fibrous materials include glass in the form of glass fibers, carbon or graphite in the form of carbon or graphite fibers, non-graphite carbon fibers, vitreous carbon fibers, boron monolithic graphite and monolithic non-graphite carbon fibers, silicon, aramid and other refractory materials. In addition, thermoplastic fibrous material may also be used. The fabric may also be a hybrid fabric, having more than one type of structural fiber in its construction, i.e., glass/thermoplastic, aramid/glass, and other combinations such as combination of the materials listed above.

FIGS. 1-2 depict a unidirectional fiber orientation of the fabric 2. There are various methods of maintaining the primary fibers in position in a unidirectional fabric including weaving, stitching, and bonding, as is known in the art. In a preferred embodiment, the fibers are crimp-free warp knitted fabrics otherwise know as stitch-bonded fabrics.

The tows are held in place by a secondary, non-structural stitching tread, typically a polyester thread or any other thread conventionally used in the art. Regardless of the structure, the fabric 2 of the present invention is a corrugated fabric, which is essentially crimp-free as a result of the flow channels 6. Preferably, the fabric 2 of the present invention is stitch-bonded using conventional stitch-bonding techniques and styles, i.e., chain, tricot, modified tricot, promat). Conventional machines known in the art such as a Liba stitch-bonding machine are used to make the fabric of the present invention.

The structure of the fabric of the present invention may also be bi-axial, tri-axial, quadaxial or multiaxial fabric structures. Conventional fabrics are made by weaving fibers in two perpendicular directions (warp and weft). Weaving, though, bends the fibers, reducing the maximum strength and stiffness that can be attained.

Typical stitch-bonded, multiaxial fabrics consist of several layers of unidirectional fiber bundles or tows held together by a non-structural stitching thread (usually polyester). The tows in each layer can be input at almost any angle between 0° and 90°. The entire fabric may be made of a single material, or different materials can be used in each layer for a hybrid fabric.

Figure 3:
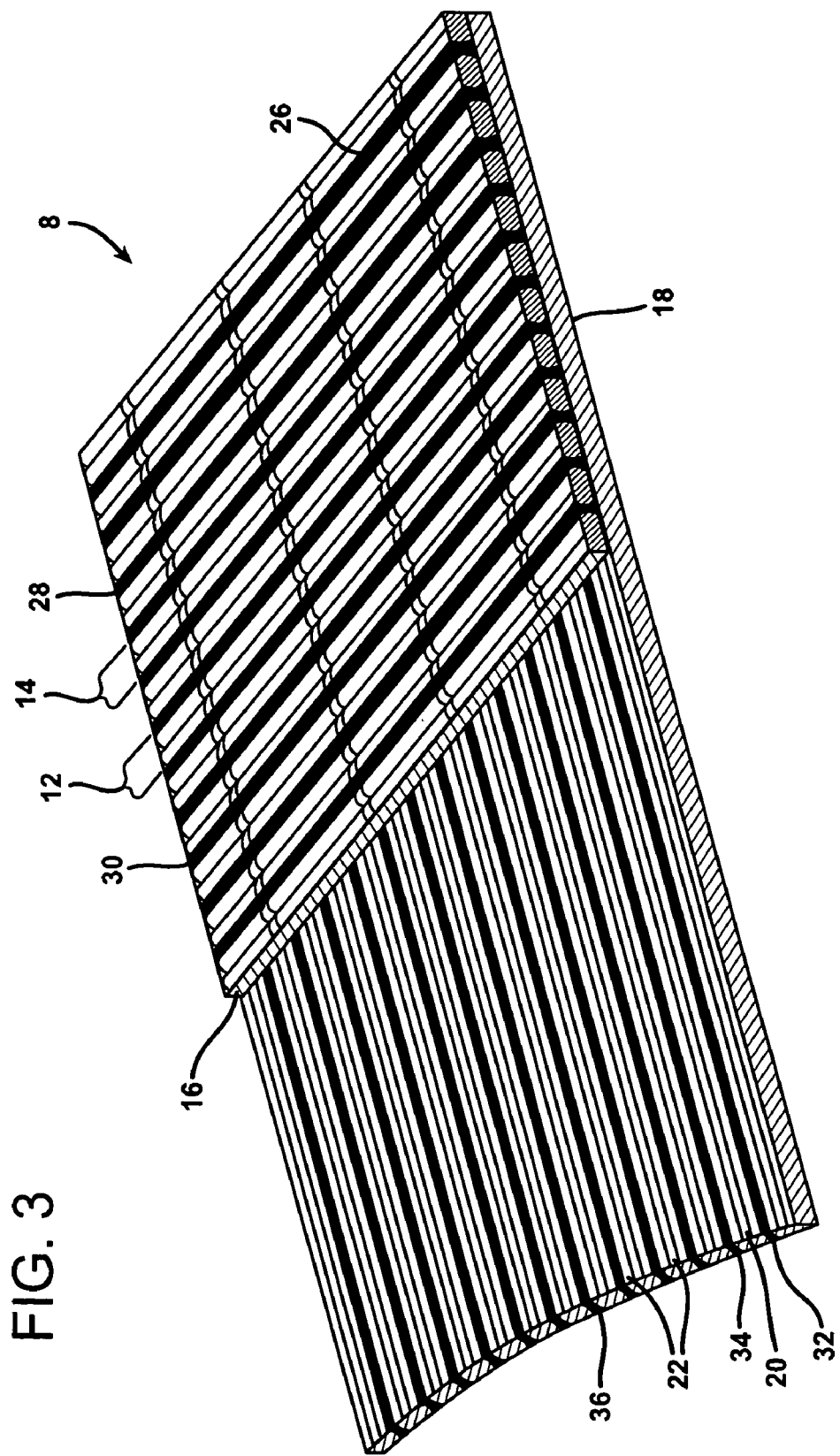
FIG. 3 is a partially sectional perspective view showing a biaxial fabric of the present invention.

FIG. 3 illustrates biaxial fabric 8 of the present invention. Fabric 8 contains layers 16 and 18. Layer 16 has tow groups 12, 14 spaced between flow channels 26, 28, 30 and layer 18 has tow groups 20, 22 spaced between flow channels 32, 34, 36. As shown in FIG. 3, the tow groups in layer 16 of biaxial fabric 8 lie at a 90° angle and the tow groups in layer 18 lie at a 0° angle which is a conventional biaxial fabric structure as is known in the art.

Figure 4:
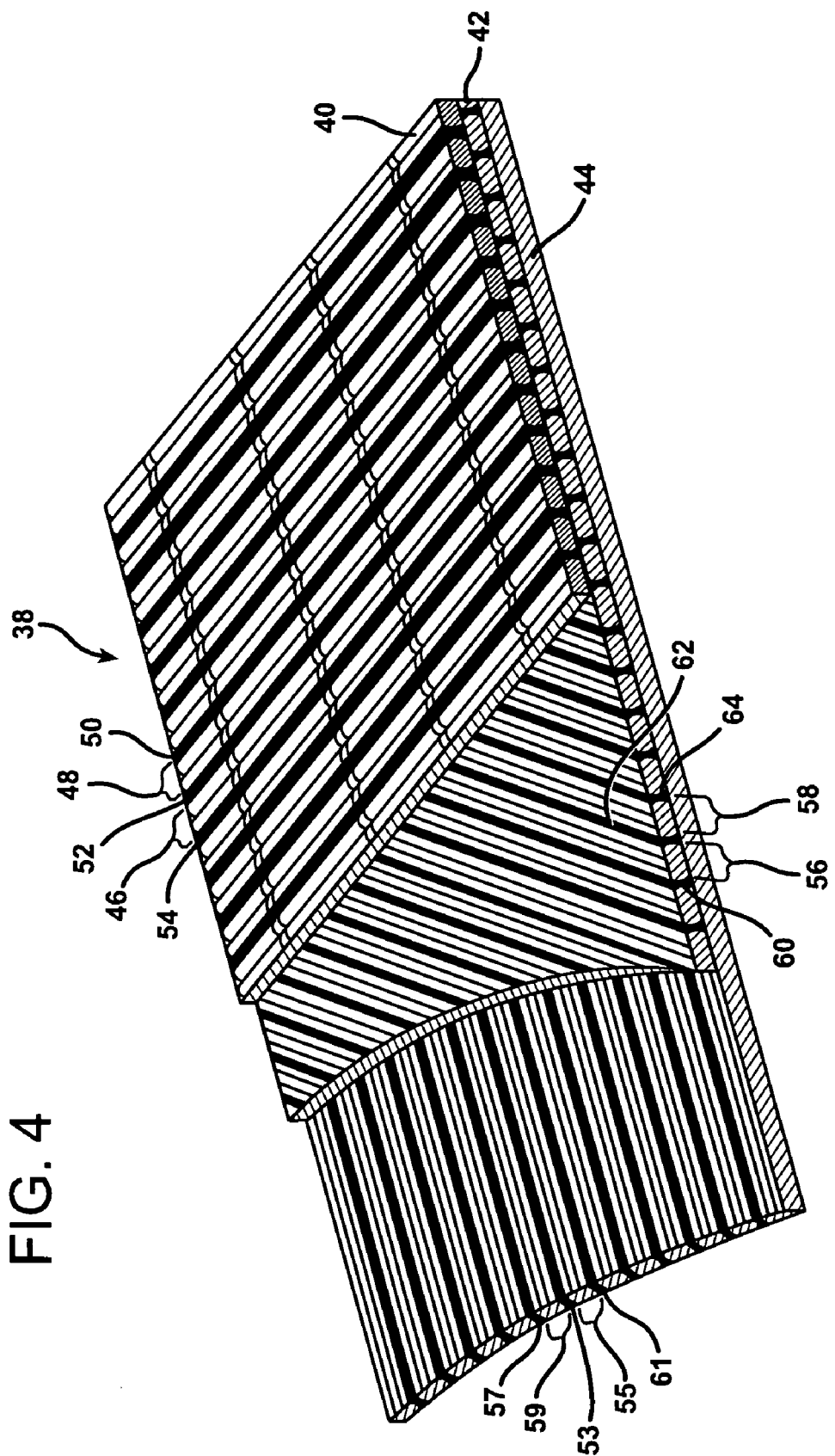
FIG. 4 is a partially sectional perspective view showing a triaxial fabric of the present invention.

FIG. 4 illustrates triaxial fabric 38 of the present invention. Fabric 38 contains layers 40, 42 and 44. Layer 40 has tow groups 46, 48 spaced between flow channels 50, 52 and 55, layer 42 has tow groups 56, 58 spaced between flow channels 60, 62 and 64 and layer 44 has tow groups 53, 55 spaced between flow channels 57, 59 and 61. As shown in FIG. 4, the tow groups in layer 40 of triaxial fabric 38 lie at a 90° angle, the tow groups in layer 42 lie at a −45° angle and the tow groups in layer 44 lie at a 0° angle which is typical construction of a triaxial fabric as is known in the art.

Figure 5:
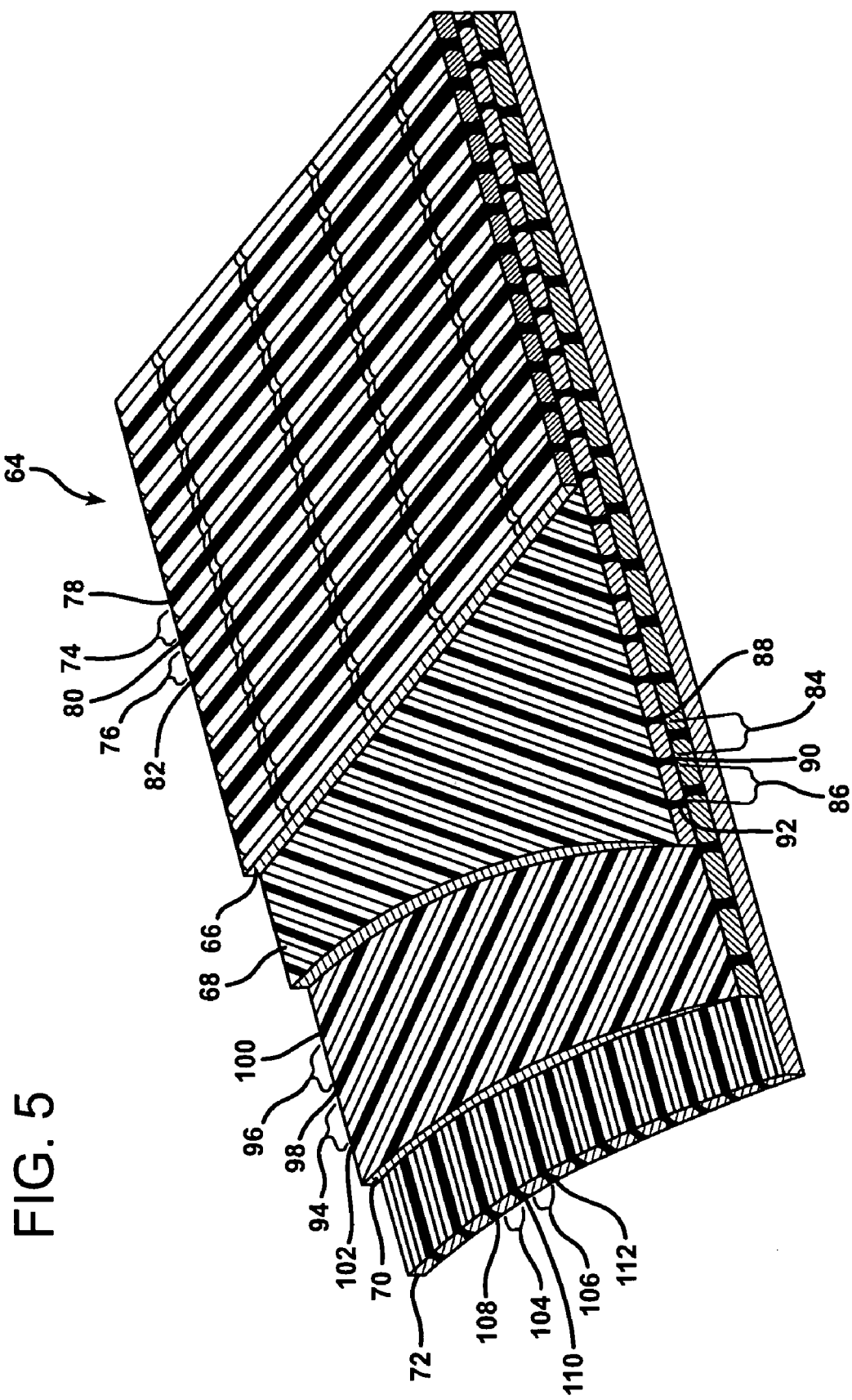
FIG. 5 is a partially sectional perspective view showing a quadaxial fabric of the present invention.

FIG. 5 illustrates quadaxial fabric 64 having layers 66, 68, 70 and 72. Layer 66 has tow groups 74, 76 and 78 spaced between flow channels 78, 80 and 82, layer 68 has tow groups 84, 86 spaced between flow channels 88, 90 and 92, layer 70 has tows groups 94, 96 spaced between flow channels 98, 100 and 102 and layer 72 has tow groups 104, 106 spaced between flow channels 108, 110 and 112. As shown in FIG. 5, the tow groups in layer 66 of triaxial fabric 64 lie at a 90° angle, the tow groups in layer 68 lie at a −45° angle, the tow groups inn layer 70 lie at a +45° angle and the tow groups in layer 72 lie at a 0° angle. This is typical construction of a quadaxial fabric as is known in the art.

Although the angles of the layers in FIGS. 3-5 are illustrated as described above, any combination of angles may be used depending on the application of the fabric. The fabrics of the present invention may be engineered to meet specific requirements and support multiple tasks according to the application of the fabric, i.e., automotive parts, etc.

As mentioned, the fabric of the present invention is particularly useful in molding processes where resin must move through a fabric to create a consolidated composite. One particular process is resin transfer molding (RTM). Resin transfer molding (RTM) is a process by which a resin is pumped at low viscosities and low pressures into a closed mold die set containing a preform of dry fabric, i.e., fabric 2, to infuse resin into the preform and to make a fiber-reinforced composite part. The RTM process can be used to produce at low cost composite parts that are complex in shape. These parts typically require continuous fiber reinforcement along with inside mold line and outside mold line controlled surfaces. The ability to include and place continuous fiber reinforcement in large and small structures sets RTM apart from other liquid molding processes. Fabric 2 is also useful in a vacuum assisted resin transfer molding (VARTM) system. In VARTM, the preform is covered by a flexible sheet or liner, such as fabric 2.

The flexible sheet or liner is clamped onto the mold to seal the preform in an envelope. A catalyzed matrix resin is then introduced into the envelope to wet the preform. A vacuum is applied to the interior of the envelope via a vacuum line to collapse the flexible sheet against the preform. The vacuum draws the resin through the preform and helps to avoid the formation of air bubbles or voids in the finished article. The matrix resin cures while being subjected to the vacuum. The application of the vacuum draws off any fumes produced during the curing process. The fabric 2 of the present invention is useful in standard vacuum infusion molding processes as well as process where the reinforced fabric is under vacuum.

Suitable thermoplastic resins useful with the present invention in the above molding processes include polyesters (including copolyesters), e.g., polyethylene terephthalate, polyamides, polyolefins, and polypropylene. Thermosetting resins that are useful include phenolic resins, epoxy resins, vinyl ester resins, and thermosetting polyester resins.

It is possible that changes in configurations to other than those shown could be used but that which is shown is preferred and typical. It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

The invention claimed is:

1. A fabric comprising a plurality of substantially parallel, aligned tows with said tows arranged in one of a plurality of tow groups, each of said tow groups having one or more tows wherein a portion of said tow groups contain two or more tows, wherein the spacing between tows in a tow group is less than the spacing between juxtaposed tow groups, wherein each tow has a longitudinal axis and the longitudinal axes of said tows in said tow groups are in a coplanar relationship, and wherein said longitudinal axes of said tows are held in place in said coplanar relationship.

2. The fabric of claim 1, wherein said adjacent tow groups contain an even number of tows.

3. The fabric of claim 1, wherein said adjacent tow groups contain an odd number of tow(s).

4. The fabric of claim 1, wherein said fabric comprises reinforced composite material.

5. The fabric of claim 1, wherein the spacing between the adjacent tow groups defines a flow channel.

6. The fabric of claim 1, wherein said tows are stitched together.

7. The fabric of claim 1, wherein the spacing between the adjacent tow groups is between about 0.155 to about 1.28 centimeters.

8. The fabric of claim 1, wherein said fabric is a crimp-free fabric.

9. The fabric of claim 1, wherein said yield of each of said tows is between about 52 to about 450 yards/pound.

10. The fabric of claim 9, wherein said yield of said tows is between about 52 to about 350 yards/pound.

11. The fabric of claim 10, wherein said yield of each of said tows is between about 150 to about 220 yards/pound.

12. The fabric of claim 1, wherein said fabric is a unidirectional fabric.

13. The fabric of claim 1, wherein said fabric is a biaxial fabric.

14. The fabric of claim 1, wherein said fabric is a triaxial fabric.

15. The fabric of claim 1, wherein said fabric is a quadaxial fabric.

16. The fabric of claim 1, wherein said tows comprise composite fibers selected from the group consisting of glass and thermoplastic.

17. A method of making a fabric comprising the steps of:
    providing a plurality of substantially parallel tows, each tow having a longitudinal axis;
    arranging all of said tows in tow groups, each of said tow group containing one or more tows wherein a portion of said tow groups contain two or more tows;
    aligning said tows so that the longitudinal axes of said tows are in a coplanar relationship;
    holding the longitudinal axes of said tows in place in a coplanar relationship;
    providing a space between said at least two of said tow groups, wherein the spacing between tows in a tow group is less than the spacing between juxtaposed tow groups.

18. The method of claim 17, wherein said tow groups are stitched together.

19. The method of claim 17, wherein said fabric is a crimp-free fabric.

20. The method of claim 17, wherein said yield of each of said tows is between about 150 to about 500 yards/pound.

21. The method of claim 20, wherein said yield of each of said tows is between about 150 to about 250 yards/pound.

22. The method of claim 21, wherein said yield of each of said tows is between about 190 to about 220 yards/pound.

23. The method of claim 17, wherein said fabric is a unidirectional fabric.

24. The method of claim 17, wherein said fabric is a biaxial fabric.

25. The method of claim 17, wherein said fabric is a triaxial fabric.

26. The method of claim 17, wherein said fabric is a quadaxial fabric.

27. The method of claim 17, wherein the spacing between the adjacent tow groups is between about 0.155 to about 1.28 centimeters.

28. The method of claim 17, wherein the spacing between the adjacent tow groups defines a flow channel.

29. The method of claim 17, further comprising the step of infusing said fabric with resin using a resin transfer molding process.

30. The method of claim 17, further comprising the step of infusing said fabric with resin using a vacuum assisted resin transfer molding system.

31. The method of claim 30, wherein said fabric is infused with a resin selected from the group consisting of polyesters and copolyesters.

32. The method of claim 31, wherein said polyesters are selected from the group consisting of polyethylene terephthalate, polyamides, polyolefins, and polypropylene.

33. The method of claim 30, wherein said fabric is infused with a resin selected from the group consisting of polyesters and copolyesters.

34. The method of claim 33, wherein said polyesters are selected from the group consisting of polyethylene terephthalate, polyamides, polyolefins, and polypropylene.

* * * * *